United States Patent [19]
Hawk

[11] 3,949,596
[45] Apr. 13, 1976

[54] LEAK TEST FIXTURE AND METHOD FOR USING SAME

[75] Inventor: Lawrence S. Hawk, Knoxville, Tenn.

[73] Assignee: The United States of America as represented by the United States Energy Research and Development Administration, Washington, D.C.

[22] Filed: Dec. 11, 1974

[21] Appl. No.: 531,587

[52] U.S. Cl. ................................ 73/40.7; 73/49.1
[51] Int. Cl.² ........................................ G01M 3/20
[58] Field of Search ............... 73/40, 46, 40.7, 49.1, 73/37; 48/193

[56] References Cited
UNITED STATES PATENTS

| | | | |
|---|---|---|---|
| 1,977,987 | 10/1934 | Corby | 73/49.1 |
| 2,062,435 | 12/1936 | Weiland | 73/46 |
| 2,567,926 | 9/1951 | Dunkelberger | 73/40 |
| 2,766,614 | 10/1956 | Cook | 73/46 |
| 3,762,212 | 10/1973 | Morley | 73/40.7 |

FOREIGN PATENTS OR APPLICATIONS

| | | | |
|---|---|---|---|
| 812,848 | 9/1951 | Germany | 73/46 |

*Primary Examiner*—S. Clement Swisher
*Assistant Examiner*—Denis E. Corr
*Attorney, Agent, or Firm*—Dean E. Carlson; David S. Zachry; David E. Breeden

[57] ABSTRACT

A method and apparatus are provided which are especially useful for leak testing seams such as an end closure or joint in an article. The test does not require an enclosed pressurized volume within the article or joint section to be leak checked. A flexible impervious membrane is disposed over an area of the seamed surfaces to be leak checked and sealed around the outer edges. A preselected vacuum is applied through an opening in the membrane to evacuate the area between the membrane and the surface being leak checked to essentially collapse the membrane to conform to the article surface or joined adjacent surfaces. A pressure differential is concentrated at the seam bounded by the membrane and only the seam experiences a pressure differential as air or helium molecules are drawn into the vacuum system through a leak in the seam. A helium detector may be placed in a vacuum exhaust line from the membrane to detect the helium. Alternatively, the vacuum system may be isolated at a preselected pressure and leaks may be detected by a subsequent pressure increase in the vacuum system.

4 Claims, 3 Drawing Figures

LEAK TEST FIXTURE AND METHOD FOR USING SAME

This invention was made during the course of, or under, a contract with the U.S. Atomic Energy Commission.

BACKGROUND OF THE INVENTION

This invention relates generally to leak detectors and methods thereof and more specifically to a leak test device and method of use for leak testing seams in an article in which only the seam is subjected to a pressure differential.

In the art of leak testing, it is often necessary to leak test an enclosure or joint of an unassembled fluid system in which it is impossible to pressurize or evacuate the enclosure or joint to effect a comprehensive leak test. A conventional prior art helium leak test, for example, requires a sealed section or container to be evacuated to a pressure of less than 0.5 torr. A helium leak detector is connected in the purge pump line and helium is introduced on the side of the sealed section or container away from the evacuated section or container. The presence of helium in the leak detector indicates a leak into the evacuated volume. The problem encountered in certain fragile or low pressure containers is that the pressure differential required for leak testing joints or seals in the container, for example, may collapse the container.

Another problem encountered in the production of even pressurized systems is testing of joints of partially assembled portions. In a piping system, for example, a seal weld or other joint of a component pipe section may require leak testing in a fabrication shop before final assembly. With prior leak test techniques the component section must be plugged or otherwise sealed to evacuate or pressurize the pipe section.

Thus, there is a need for a test fixture and method to leak test seams, such as container seals or pipe joints which does not require the application of a pressure differential to the entire surface area of the container or joined sections.

SUMMARY OF THE INVENTION

In view of the above need, it is an object of this invention to provide a method for leak testing seams in an article which does not require the application of a pressure differential to the entire article surface.

Another object of this invention is to provide a method for leak testing in which a flexible impervious membrane is disposed over a seamed surface to be leak tested and the volume between the membrane and the surface is evacuated to concentrate a pressure differential only to the seamed areas of said surface at which a leak may be present.

Yet another object of this invention is to provide a leak testing apparatus for carrying out the above objects.

Other objects and many of the attendant advantages of the present invention will be obvious from the following detailed description of the invention taken in conjunction with the accompanying drawings.

DETAILED DESCRIPTION

Figure 1:
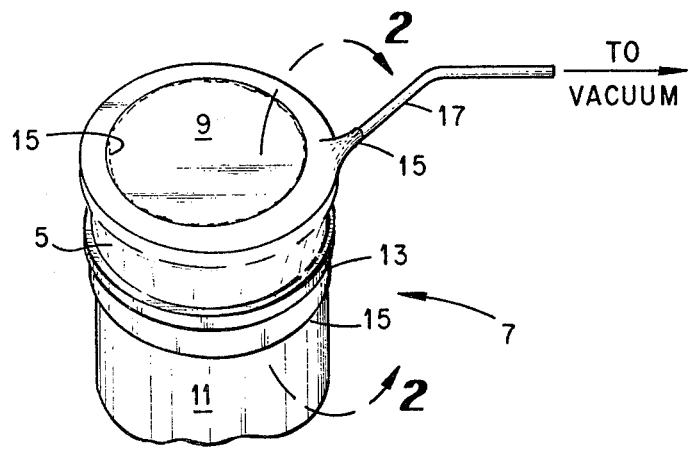
FIG. 1 is a pictorial view of a leak test fixture according to the present invention for leak checking the end seal of a container.

Referring now to FIG. 1, there is shown one embodiment of the invention wherein a fitted flexible rubber membrane 5 or similar impervious plastic material is disposed over the sealed end of a container such as a drum 7 to leak check the seam between the end cap 9 and side 11 of the drum 7. The membrane 5 may completely or partially enclose, as shown, the end of drum 7. A clamp 13 may be provided to insure a good seal between membrane 5 and the side 11 of the drum. A plastic sealant 15, such as one of a number of commercially available hydrocarbon waxes used for vacuum system seals, may be placed along the contact edges of the membrane 5 to seal the membrane enclosed area over the drum end surface. One example of a suitable sealant is a hydrocarbon wax sold under the trademark "Apiezon-Q" available from James G. Biddle Company, Philadelphia, Pa. At least one vacuum exhaust line 17 is provided in the membrane 5 through which the area between the membrane and the enclosed drum surface may be evacuated. The exhaust line 17 may be a metallic tubing sealed in a port in the membrane 5 with additional plastic sealant 15.

Figure 2:
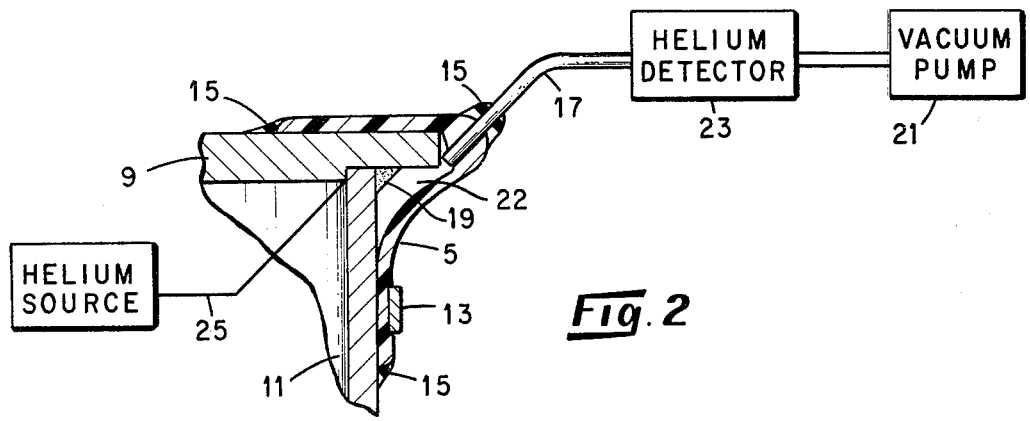
FIG. 2 ia partial cross-sectional view of the leak test fixture of FIG. 1, taken along line 2—2, along with a schematic representation of an entire leak check system in which the fixture is employed.

As shown in FIG. 2, which is an expanded cross sectional view of the membrane covered end seal of the drum 7 of FIG. 1, the end cap 9 of the drum 7 may, for example, be seal welded at its periphery, as indicated at 19. The seal welded seam 19 is then checked for leakage by connecting a vacuum pump 21 to the exhaust port line 17 to evacuate the membrane enclosed area. As the evacuation process proceeds, the membrane 5 essentially collapses onto the drum surface and only a small surface area at the seam 19 within volume 22 of the membrane enclosed area is subjected to a pressure differential. Since the membrane 5 contacts the surfaces of the drum adjacent the seam 19 there is no pressure differential applied to these surfaces. Therefore, it will be seen that a substantial differential pressure is concentrated at the seam 19 without the risk of distorting or rupturing the drum. If a low or nonpressurized container, such as the drum 7 were pressurized or evacuated to leak check the seam 19, as in the prior art, the walls could easily be distorted or ruptured at relatively low seam pressure differentials.

Various methods may be used to detect a leak area in the seam weld area 19. One method is to introduce helium into the drum interior and connect a conventional helium detector 23 in the exhaust line 17. Any leak in the seam 19 will allow the helium to be picked up in the vacuum line 17 and detected by detector 23. If the interior of the seam is accessible, as through a fill port in the drum 7, a conventional helium probe 25 may be used to introduce very small amounts of helium in isolated areas about the seam 19 so that when the probe passes a leak detector 23 will indicate a helium detection and the point can be marked for inspection or repair.

Alternatively, a leak may be detected by simply monitoring the pressure in the exhaust line once the vacuum is established. If a leak is detected, the membrane may be removed and a smaller membrane may be used to check small areas of a seam or other suspected areas of a container. The smaller membrane with a vacuum port may be placed over selected areas and sealed around the edges with the plastic sealant and evacuated to isolate the leak.

Figure 3:
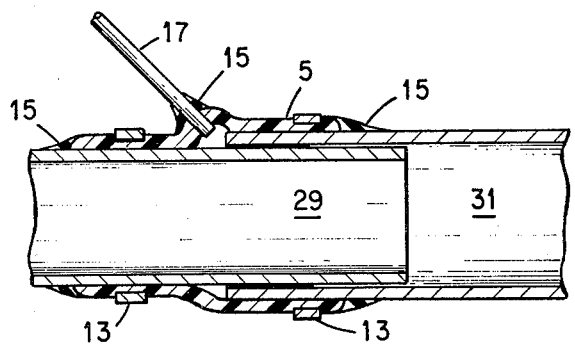
FIG. 3 is a cross-sectional view of an alternate embodiment of the present invention as employed to leak test a pipe joint.

Referring now to FIG. 3, there is shown an alternate embodiment of the leak test rig wherein the membrane 5 is in the form of a ring which may be disposed over a welded joint of pipe sections 29 and 31. The membrane may be sealed by means of clamps 13 adjacent the edges of the membrane 5; also the edges of the membrane may be sealed with the plastic sealant 15. When a vacuum is applied to the vacuum port line 17, as described above with reference to FIG. 2, the membrane seals against the pipe surfaces adjacent the joint and the pressure differential is concentrated at the pipe joint seams. A leak in the joint may be located by one of the methods as described above.

Although the invention has been described by way of specific example, it will be understood that various other embodiments and methods of use within the scope of the appended claims will become apparent to those skilled in the art from the above disclosure.

What is claimed is:

1. A method for leak testing a seam in an article, comprising the steps of:

covering said seam and the surfaces adjacent thereto with an impervious, flexible membrane readily conformable to said surfaces adjacent said seam;

sealing the outer edges of said membrane to said surfaces;

evacuating the volume between said membrane and said surfaces to collapse said membrane into a conforming contact with said surfaces and to concentrate at a small space between said surface and said membrane at said seam a pressure differential only across said seam; and checking to detect the passage of a gas through said seam into the evacuated volume between said membrane and said seam when a leak is present in said seam.

2. The method as set forth in claim 1 wherein said checking step includes providing a helium source at said seam on a side opposite said surface of said article and providing a helium detector to detect the presence of helium in said evacuated volume when a leak is present in said seam.

3. A system for leak testing a seam in an article comprising:

an impervious, flexible membrane for disposition over said seam and the surfaces adjacent thereto, said membrane being readily conformable to said adjacent surfaces and having at least one vacuum port therein disposed to communicate with the area of said seam;

a vacuum pump connected through said at least one vacuum port of said membrane for evacuating the volume between said membrane and said surfaces to collapse said membrane into a conforming contact with said adjacent surface and concentrate a pressure differential at a small space only in the area of said seam, thereby preventing the application of test pressure to said adjacent surfaces; and means for checking to detect the passage of a gas through said seam into the evacuated volume between said membrane and said seam when a leak is present in said seam.

4. The system as set forth in claim 3 wherein said membrane is made of rubber molded to generally conform to the surfaces of said article over which said membrane is disposed and sealing means disposed at the edges of said membrane for sealing the volume between said membrane and said surfaces.

* * * * *